United States Patent
Wu et al.

[11] Patent Number: 5,865,926
[45] Date of Patent: Feb. 2, 1999

[54] METHOD OF MAKING A CLOTH-LIKE MICROPOROUS LAMINATE OF A NONWOVEN FIBROUS WEB AND THERMOPLASTIC FILM HAVING AIR AND MOISTURE VAPOR PERMEABILITIES WITH LIQUID-BARRIER PROPERTIES

[75] Inventors: Pai-Chuan Wu; Leopoldo V. Cancio; Girish K. Sharma, all of Cincinnati, Ohio

[73] Assignee: Clopay Plastic Products Company, Inc., Cincinnati, Ohio

[21] Appl. No.: 602,130

[22] Filed: Feb. 15, 1996

[51] Int. Cl.$^6$ ............................... B32B 31/08; B32B 31/16
[52] U.S. Cl. ............... 156/229; 156/244.24; 156/244.27; 156/324
[58] Field of Search ..................... 156/229, 324, 156/183, 244.24, 244.27, 219, 220; 264/282

[56] References Cited

U.S. PATENT DOCUMENTS

| | | | |
|---|---|---|---|
| 2,714,571 | 8/1955 | Irion et al. ............................. | 154/139 |
| 3,058,868 | 10/1962 | Schroeder . | |
| 3,622,422 | 11/1971 | Newman ................................ | 156/306 |
| 4,153,664 | 5/1979 | Sabee ..................................... | 264/289 |
| 4,379,197 | 4/1983 | Cipriani et al. ....................... | 428/220 |
| 4,517,714 | 5/1985 | Sneed et al. ............................ | 28/103 |
| 4,522,203 | 6/1985 | Mays ...................................... | 128/132 |
| 4,614,679 | 9/1986 | Farrington et al. ..................... | 428/138 |
| 4,692,368 | 9/1987 | Taylor et al. ........................... | 428/137 |
| 4,725,473 | 2/1988 | Van Gompel et al. ................. | 428/156 |
| 4,753,840 | 6/1988 | Van Gompel .......................... | 428/171 |
| 5,035,941 | 7/1991 | Blackburn .............................. | 428/286 |
| 5,200,247 | 4/1993 | Wu et al. ................................ | 428/131 |
| 5,407,979 | 4/1995 | Wu et al. ................................ | 524/47 |
| 5,409,761 | 4/1995 | Langley ................................. | 428/198 |

OTHER PUBLICATIONS

E.A. Vaughn, "Nonwoven Fabric Primer and Reference Sampler", Assn of the Nonwoven Fabrics Industry, 1992.

Primary Examiner—Daniel Stemmer
Attorney, Agent, or Firm—Wood, Herron & Evans, L.L.P.

[57] ABSTRACT

A cloth-like microporous laminate of a nonwoven fibrous web and thermoplastic film is made by lamination of a microporous-formable film composition and a nonwoven fibrous web followed by incremental stretching to form the cloth-like microporous laminate. The cloth-like microporous laminate has air and moisture vapor permeabilities, but acts as a barrier to the passage of liquids. The cloth-like laminates are especially useful in fabricating garments in order to provide the breathable qualities of air and moisture vapor transmission with liquid-barrier properties. Such garments include baby diapers, baby training pants, catamenial pads and garments, and the like where moisture vapor and air transmission properties, as well as fluid barrier properties, are needed.

17 Claims, 2 Drawing Sheets

METHOD OF MAKING A CLOTH-LIKE MICROPOROUS LAMINATE OF A NONWOVEN FIBROUS WEB AND THERMOPLASTIC FILM HAVING AIR AND MOISTURE VAPOR PERMEABILITIES WITH LIQUID-BARRIER PROPERTIES

BACKGROUND OF THE INVENTION

Processes of bonding nonwoven fibrous webs to thermoplastic films have been known for some time. Additionally, methods for extrusion laminating thermoplastic films to unstretched nonwoven webs are well known in the art.

Relevant patents regarding extrusion lamination of unstretched nonwoven webs include U.S. Pat. Nos. 2,714,571; 3,058,868; 4,522,203; 4,614,679; 4,692,368; 4,753,840 and 5,035,941. The above '863 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base plies prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose nonwoven fibers to polymeric film are disclosed in U.S. Pat. Nos. 3,622,422; 4,379,197 and 4,725,473.

It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

Efforts have also been made to make breathable nonwoven composite barrier fabrics which are impervious to liquids, but which are permeable to water vapor. U.S. Pat. No. 5,409,761 is an example of a fabrication process from the patent art. According to this '761 patent, a nonwoven composite fabric is made by ultrasonically bonding a microporous thermoplastic film to a layer of nonwoven fibrous thermoplastic material. These methods and other methods of making breathable laminates of nonwoven and thermoplastic materials tend to involve expensive manufacturing techniques and/or expensive raw materials.

There is a continuing need for improved breathable laminates of nonwoven fibrous substrates and thermoplastic films that provide air and moisture vapor permeabilities with liquid-barrier properties. It would be very desirable to further improve methods of making such breathable laminates and to expand their utilities in articles of clothing and other useful products. Improvements are also desirable in methods of producing laminates on high-speed production machinery.

SUMMARY OF THE INVENTION

This invention is directed to a method of making a cloth-like microporous laminate of a nonwoven fibrous web and thermoplastic film. The microporous laminate has air and moisture vapor permeabilities, but acts as a liquid barrier. The laminate is also cloth-like by providing a nonwoven fibrous soft fabric feel. Thus, breathable laminates of this invention are especially useful in the field of garments where breathable and barrier properties are important, for instance, in medical garments where it is desired to prevent the passage of body fluids or blood to or from the worker while allowing the passage of moisture vapor. It is also desirable to provide garments which are gas or air permeable to provide enhanced comfort for the wearer by allowing the perspiration to escape while maintaining a barrier to the passage of liquids.

The method of this invention involves lamination by extrusion or adhesion of the nonwoven fibrous web to a microporous-formable thermoplastic film. The microporous-formable thermoplastic composition of the film laminate may comprise a blend of a thermoplastic polymer and a mechanical pore-forming agent such as an inorganic filler. The pore-forming agent in the film laminate is then activated upon incremental stretching to form a microporous laminate of the fibrous web and film. This unique method provides economies in manufacturing breathable laminates. However, other microporous-formable compositions may be used in the process as further described hereinafter.

In the most preferred form, the method of this invention is conducted on high-speed production machinery on the order of about 200–500 fpm. More specifically, a nonwoven fibrous web is introduced into a nip of rollers for extrusion lamination with a microporous-formable thermoplastic film or extrudate. A thermoplastic extrudate is extruded into the nip at a temperature above its softening point to form a film laminated to the fibrous web. The compressive force between the fibrous web and extrudate is controlled to bond one surface of the web to the film to form a laminate. As indicated above, the laminate may also be formed by adhesively bonding the fibrous web to the microporous-formable film. The thus formed laminate is then incrementally stretched along lines substantially uniformly across the laminate and throughout its depth to render the film microporous. By applying an incremental stretching force to the laminate, both the web and the film are stretched. Incrementally stretching the film at ambient or room temperature where the microporous-formable thermoplastic composition contains a mechanical pore-forming filler such as calcium carbonate, causes microporosity to develop in the film whereby the film is capable of transmitting moisture vapor and air, but acts as a barrier to the transmission of liquid. Breathable cloth-like liquid barriers are economically provided by this invention.

Other benefits, advantages and objectives of this invention will be further understood with reference to the following detailed description.

DETAILED DESCRIPTION

It is a primary objective of this invention to produce a breathable or microporous laminated sheet of a nonwoven fibrous web and a microporous thermoplastic film on high-speed production machinery. It is the further objective of this invention to produce such laminates having satisfactory bond strengths while maintaining the appearance of a fabric or cloth having suitable moisture vapor transmission rates and air permeability, while maintaining liquid-barrier properties. As developed above, these and other objectives are achieved in a preferred form of the invention by first laminating a nonwoven fibrous web and a microporous-formable thermoplastic film. Then, it has been found, by incrementally stretching the laminate, that a breathable or microporous laminate is produced where the fibrous web is bonded to the microporous film. The microporous film is characterized by being impervious to the passage of liquid by virtue of the thermoplastic film while maintaining a soft feel on the fibrous web surface of the laminate. Various degrees of moisture vapor or air permeabilities may be achieved in the laminate by providing the micropores in the range of about 0.1 micron to about 1 micron. The micropores are provided by employing microporous-formable thermoplastic compositions which include a pore-forming filler such as calcium carbonate, diatomaceous earth, or titanium dioxide, or combinations thereof having an average particle size of about 0.5 to about 5 microns. The pore-forming filler in the extruded film is activated by mechanical incremental stretching of the film. In an alternative form, a microporous-formable thermoplastic composition may be obtained by blending different polymers which, when incrementally stretched, provide microporosity as described in U.S. Pat. Nos. 5,200,247 and 5,407,979 which are incorporated herein by reference.

Thus, the method of this invention provides a microporous laminate having the desired cloth-like features to achieve utility in a number of applications including diapers, pants, surgical gowns, sheets, dressings, hygienic products, and the like. Garments of these types are made very comfortable by the use of these laminates in view of their enhanced breathability and barrier properties.

A. Materials for the Laminate

The microporous-formable film composition can be achieved by formulating a thermoplastic polymer with suitable additives and pore-forming fillers to provide an extrudate or film for lamination with the nonwoven web. Microporous-formable compositions of polyolefins, inorganic pore-forming fillers and other additives to make microporous sheet materials are known. However, it has not been known to laminate such compositions with a nonwoven fibrous web and then incrementally stretch the laminate to create microporosity in the laminate. This method may be done inline and provides economies in manufacturing and/or materials over known methods of making laminates. In addition, as developed above, microporous-formable polymer compositions may be obtained from blends of polymers such as a blend of an alkanoyl polymer and polyvinyl alcohol as described in U.S. Pat. No. 5,200,247. In addition, blends of an alkanoyl polymer, destructured starch and an ethylene copolymer may be used as the microporous-formable polymer composition as described in U.S. Pat. No. 5,407,979. With the se polymer b lends, it is unnecessary to use pore-forming fillers to provide microporosity upon incremental stretching. Rather, the different polymer phases in the film themselves, when the film is stretched at ambient or room temperature, produce microvoids.

The microporous-formable thermoplastic film preferably is of the polyolefin type and may be any of the class of thermoplastic polyolefin polymers that are processible into a film for direct lamination by melt extrusion onto the fibrous web. A number of thermoplastic polymers suitable in the practice of the invention are of the normally-solid oxyalkanoyl polymers or dialkanoyl polymers represented by poly(caprolactone) blended with polyvinylalcohol or starch polymers that may be film-formed. The olefin based polymers include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. Other examples of polymers suitable for use as films in the composite sheet of this invention are known with reference to the above identified patents cited in the background of this invention and these are incorporated herein by reference.

The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, Association of the Nonwoven Fabrics Industry, 3d Edition (1992).

In a preferred form, the microporous laminate employs a film having a gauge or a thickness between about 0.25 and 10 mils and, depending upon use, the film thickness will vary and, most preferably, in disposable applications is the order of about 0.25 to 2 mils in thickness. The nonwoven fibrous webs of the laminated sheet normally have a weight of about 5 grams per square yard to 75 grams per square yard preferably about 20 to about 40 grams per square yard. When employing adhesive lamination, adhesives such as hot melt adhesive, water base adhesive or solid base adhesive may be used. The composite or laminate can be incrementally stretched in the cross direction (CD) to form a CD stretched composite. Furthermore, CD stretching may be followed by stretching in the machine direction (MD) to form a composite which is stretched in both CD and MD directions. As indicated above, the microporous composite or laminate may be used in many different applications such as baby diapers, baby training pants, catamenial pads and garments, and the like where moisture vapor and air transmission properties, as well as fluid barrier properties, are needed.

B. Stretchers for the Microporous-Formable Laminates

A number of different stretchers and techniques may be employed to stretch the starting or original laminate of a nonwoven fibrous web and microporous-formable film. These laminates of nonwoven carded fibrous webs of staple fibers or nonwoven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched laminate of nonwoven fibrous web and microporous-formable film to form the microporous laminate of this invention. The stretching operation is usually employed on an extrusion laminate of a nonwoven fibrous web of staple fibers or spun-bonded filaments and microporous-formable thermoplastic film. In one of the unique aspects of this invention a laminate of a nonwoven fibrous web of spun-bonded filaments may be incrementally stretched to provide a very soft fibrous finish to the laminate that looks like cloth. The laminate of nonwoven fibrous web and microporous-formable film is incrementally stretched using, for instance, the CD and/or MD intermeshing stretcher with one pass through the stretcher with a depth of roller engagement at about 0.060 inch to 0.120 inch at speeds from about 200 fpm to 500 fpm or faster. The results of such incremental or intermesh stretching produces laminates that have excellent breathability and liquid-barrier properties, yet provide superior bond strengths and soft cloth-like textures.

DETAILED EXAMPLES OF THE INVENTION

The following examples illustrate the microporous laminates of this invention and methods of making them. In light of these examples and this further detailed description, it is apparent to a person of ordinary skill in the art that variations thereof may be made without departing from the scope of this invention.

The invention is further understood with reference to the drawings in which.

EXAMPLE 1

A blend of polyethylene and ethylene vinyl acetate having the following composition was extrusion laminated to a nonwoven fibrous web of spun-bonded polyethylene and then incrementally stretched to provide a microporous laminate.

34.1% of polyethylene (Dowlex 2045 from Dow Chemical)

11.4% of ethylene vinyl acetate (Elvax 3128 from DuPont)

45.5% of stearic acid treated calcium carbonate (particle size from about 0.5 to 8 microns with an average of about 1 micron)

9.1% of glycerol monostearate

Figure 1:
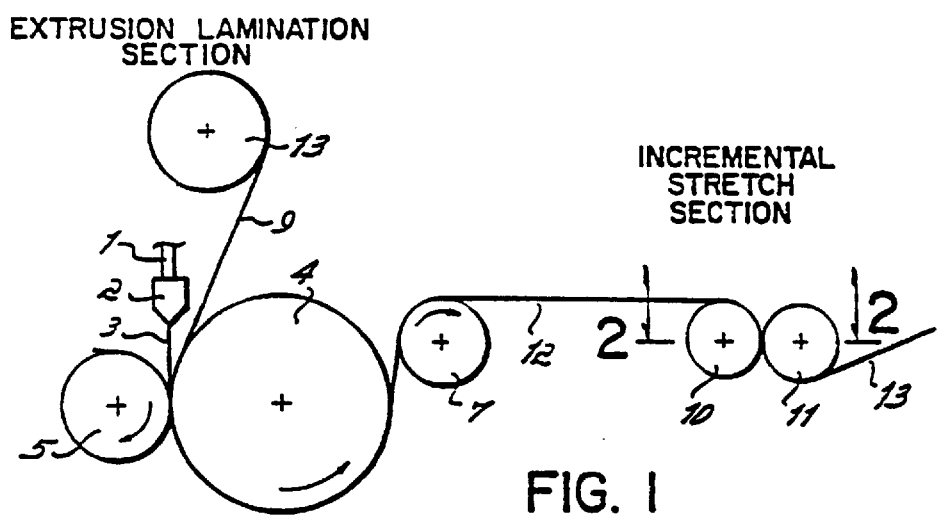
FIG. 1 is a schematic of an inline extrusion lamination and incremental stretching apparatus for making the microporous laminate of this invention.
Figure 3:
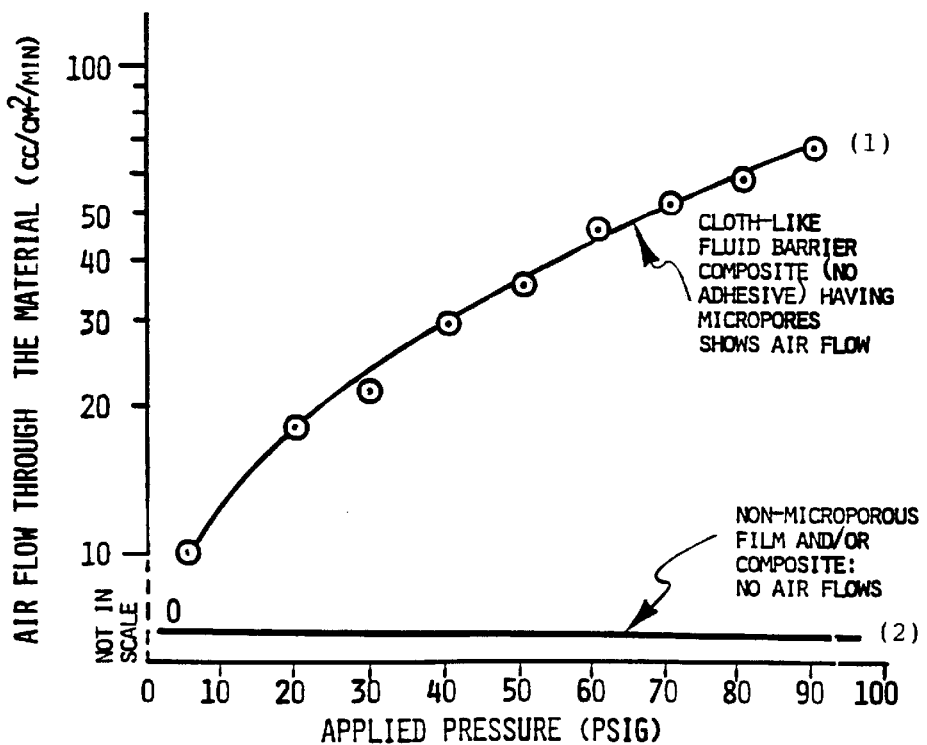
FIG. 3 is a graph demonstrating the air permeability properties of cloth-like microporous laminates.

One spun-bonded polyethylene fibrous web of 28 grams/yd$^2$ weight was laminated by extrusion of the above microporous-formable composition employing the extrusion laminator of FIG. 1. As shown schematically in FIG. 1, the incoming web 9 from roller 13 were introduced into the nip of a rubber roll 5 and a metal roll 4. The polyethylene extrudate or film 3 from extruder 1 was extruded through die 2 into the nip while the nonwoven fibrous web 9 was introduced. Typically, at speeds over 300 fpm in this extrusion lamination section, the polyethylene film 3 on the order of about 0.25 to 10 mils in thickness is laminated at melt temperatures on the order of about 400°–500° F. to form the laminate 12 which is taken off at roller 7. The compressive force at the nip is controlled such that the webs are bonded to the polyolefin film to avoid pinholing and preserve the fibrous feel on the fiber surfaces of the laminate 12. Pressures on the order of about 10 to 80 psi are sufficient to achieve satisfactory bond for fibrous webs of about 5 to 75 grams/yd$^2$. The laminate produced by the extrusion of FIG. 1 does not show any air flow (see FIG. 3, Curve 2).

While the pressure at the nip of rolls 4,5 is used to laminate the web and film 3, it should be understood that a vacuum roller can also be used at the nip to cause lamination.

Figure 2:
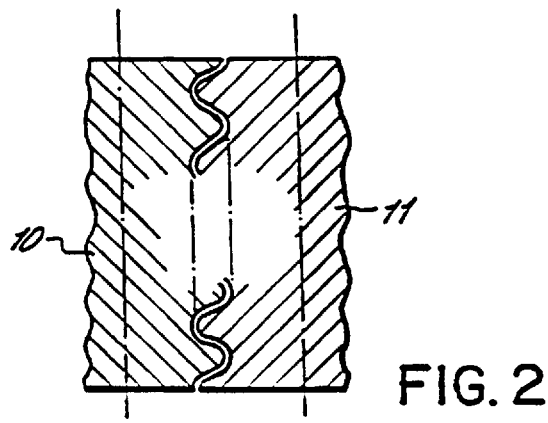
FIG. 2 is a cross sectional view taken along the line 2—2 of FIG. 1 illustrating the intermeshing rollers in diagrammatic form.
Figure 4:
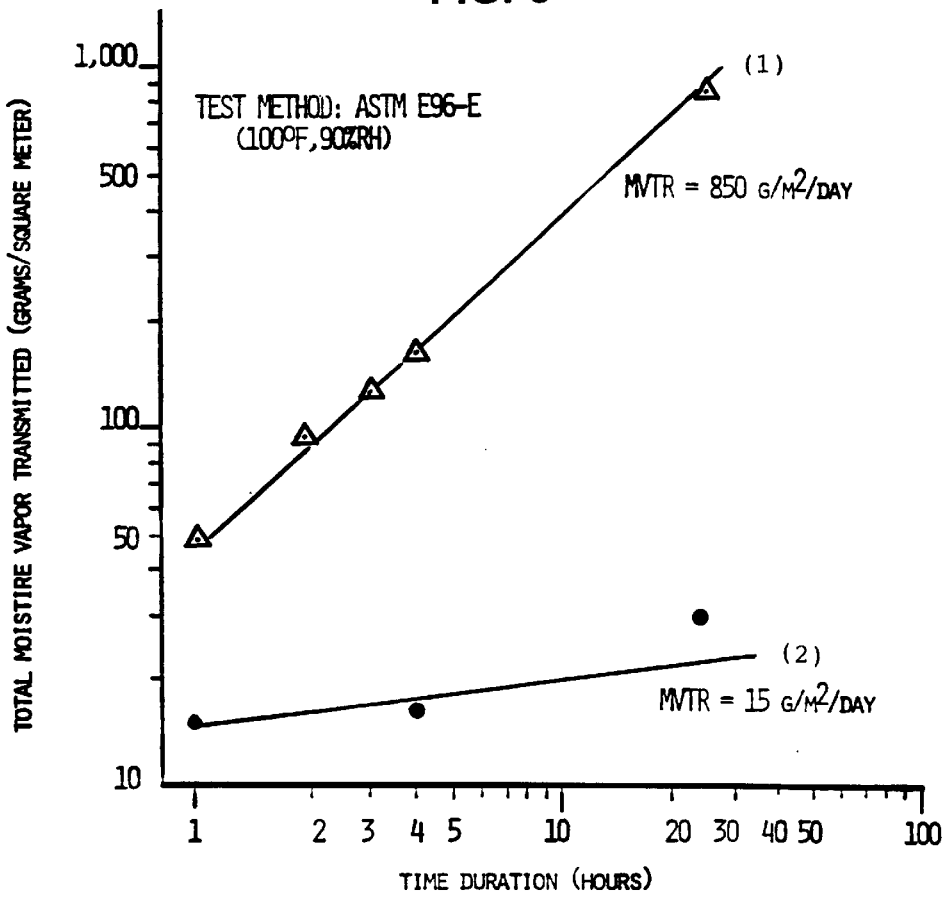
FIG. 4 is a graph demonstrating the moisture vapor transmission properties of microporous laminates for comparison with non-microporous films and/or composites.

As shown schematically in FIG. 1, where the incoming laminate 12 at an ambient temperature of about 70°–90° F. was passed through the CD incremental stretcher rollers 10 and 11 at a depth of roller engagement of about 0.100" at about 300 fpm, a microporous laminate 13 of this invention was formed. The intermeshing rollers 10 and 11, which are diagrammatically shown in FIG. 2 have been described above to illustrate the uniform stretching along lines across the laminate (CD) in a first direction and through the depth of the laminate. The MD stretcher rollers which have been described above, but are not shown in FIG. 1, stretch the laminate at a depth of engagement of about 0.060" at about 300 fpm in a second direction substantially perpendicular to the first directional stretch. Under these stretching conditions, the calcium carbonate in the polymer formulation aids in forming a microporous laminate. The microporous laminate 13, after CD and MD stretching, does show air flow (see FIG. 3, Curve 1) and a high moisture vapor transmission rate (see FIG. 4, Curve 1).

EXAMPLE 2

The microporous-formable composition of Example 1 was extrusion laminated in a manner similar to that of Example 1 and the bond strength was controlled to result in a tight bond, but peelable at a peel force of about 100–500 grams/inch. The microporous-formable laminate was then CD and MD stretched at about 70°–90° F. at 300 fpm by using the same CD and MD rollers described above at various engagement depths. Table II hereinafter presents the data as a result of these operations and the properties of the resulting microporous laminate.

TABLE II

|  | II | II-A | II-B | II-C |
|---|---|---|---|---|
| CD Engagement (inches) | 0 | 0.080 | 0.100 | 0.120 |
| MD Engagement (inches) | 0 | 0.060 | 0.060 | 0.060 |
| Total weight of the laminate (grams/yd$^2$) | 64 | 42 | 35 | 30 |
| MVTR g/m$^2$/day (ASTM E96E) 100° F., 90% RH | 15 | 1140 | 1500 | 1700 |
| Air Flow (CC/cm$^2$/min) at |  |  |  |  |
| 5 psig | 0 | 2 | 3 | 4 |
| 10 psig | 0 | 4 | 10 | 13 |
| 20 psig | 0 | 10 | 20 | 25 |
| Weight Reduction After Stretching (%) | 0 | 34 | 45 | 52 |

EXAMPLE 3

The formulation of Example 1 is extruded into a 1.5 mil film gauge and laminated to a spun-bonded polyethylene at 0.8 oz/yd$^2$ by using a hot melt spray unit where the adhesive is styrene-isoprenestyrene block copolymer and rosin ester. This laminated composite is then CD intermeshed and stretched at about 70°–90° F. at 300 fpm by rollers having an engagement depth of 0.110", followed by MD stretching with an engagement depth of 0.050" using the same CD/MD stretcher rollers described above. The resulting microporous laminate has an MVTR (ASTM E96E) of 1515 grams/m$^2$/day at 100° F. and 90° RH.

EXAMPLE 4

The following additional microporous-formable thermoplastic compositions may be used in making a microporous laminate of this invention (% by weight).

Composition A
Polyolefin (linear low density polyethylene, high density polyethylene, or polypropylene) (17%–82%)
Inorganic filler (17%–67%)
Liquid or waxy hydrocarbon polymers such as liquid polybutene, liquid polybutadiene or hydrogenated liquid polybutadiene (1%–67%)
Composition B
High density polyethylene (60%)
Ethylene vinyl acetate (6%)
Diatomaceous earth (18%)
Titanium dioxide (0.3%)
Calcium carbonate (6%)
Composition C
Polyethylene (74%–50%)
Inorganic Filler (26%–50%)
Composition D
Ethylene propylene diene monomer or ethylene propylene rubber (60%–20%)
Inorganic filler (40%–80%)

| Composition E | |
|---|---|
| Polybutene - 1 | 47.4% |
| Calcium carbonate | 47.4% |
| Polystyrene | 5.0% |
| Stearic Acid | 0.2% |

In view of the above detailed description, it will be understood that variations will occur in employing the principles of this invention depending upon materials and conditions as will be understood to those of ordinary skill in the art.

What is claimed is:

1. A method of making a breathable and liquid-barrier laminate of a nonwoven fibrous web and a microporous thermoplastic film comprising introducing a nonwoven fibrous web and a microporous-formable thermoplastic film into a nip of rollers, controlling the compressive force between said web and film at the nip to bond the surface of the web to the film to form a laminated sheet, applying an incremental stretching force at ambient temperature to said laminated sheet substantially uniformly along lines across the laminated sheet and throughout its depth to provide a microporous laminate, whereby said microporous laminate transmits moisture vapor and air, and provides a barrier to the passage of liquid.

2. The method of claim 1 wherein said laminating step comprises extrusion, or adhesive lamination.

3. The method of claim 1 wherein said fibrous web comprises polyolefin fibers.

4. The method of claim 1 wherein said microporous-formable film is a polyolefin film.

5. The method of claim 1 wherein said fibers are selected from the group consisting of polypropylene, polyethylene, polyesters, cellulose, rayon, nylon, and blends of two or more of such fibers.

6. The method of claim 1 wherein said microporous-formable film is selected from the group consisting of polyethylene, polypropylene and copolymers thereof containing a pore-forming filler.

7. The method of claim 1 wherein said microporous-formable film is selected from the group consisting of polyvinyl alcohol, polycaprolactone, starch polymers and blends thereof.

8. The method of claim 1 wherein the fibrous web has a weight from about 5 to about 70 grams/yd$^2$ and the microporous film has a film thickness of about 0.25 to about 10 mils.

9. The method of claim 1 wherein said web is formed from staple or spun-bonded fibers.

10. The method of claim 1 wherein said laminating step includes the application of vacuum to said laminated sheet.

11. A method of extrusion laminating a breathable and liquid-barrier laminate of a nonwoven fibrous web and a microporous thermoplastic film comprising introducing a continuous length of nonwoven fibrous web into a nip of rollers for laminating with a microporous-formable thermoplastic film, continuously extruding into said nip a microporous-formable thermoplastic extrudate at a temperature above its softening point to form a film, controlling the compressive force between said web and film at the nip to bond the surface of the web to the film to form a laminated sheet, continuously introducing inline said laminated sheet into incremental stretching rollers at ambient temperature to incrementally stretch said laminated sheet substantially uniformly along lines across the laminated sheet and throughout its depth to provide a microporous laminate, whereby said microporous laminate transmits moisture vapor and air and provides a barrier to the passage of liquid.

12. The method of claim 11 wherein said fibers are selected from the group consisting of polypropylene, polyethylene, polyesters, cellulose, rayon, nylon, and blends of two or more of such fibers, and said microporous-formable film is selected from the group consisting of polyethylene, polypropylene and copolymers thereof containing a pore-forming filler.

13. The method of claim 11 wherein said microporous-formable film is selected from the group consisting of polyvinyl alcohol, polycaprolactone, starch polymers and blends thereof.

14. The method of claim 11 wherein the fibrous web has a weight from about 5 to about 70 grams/yd$^2$ and the microporous film has a film thickness of about 0.25 to about 10 mils.

15. The method of claim 11 wherein said incremental stretching rollers comprise a first section and a second section and said laminated sheet is incrementally stretched in a first direction by said first section followed by incremental stretching in a second direction by said second section.

16. The method of claim 15 wherein said first and second stretching directions are substantially perpendicular to one another.

17. The method of claim 11 wherein the microporous film has a film thickness of about 0.25 to 2 mils.

* * * * *